Nov. 8, 1949     D. J. DANIEL     2,487,316

LINE SLACK ELIMINATOR FOR REELS

Filed July 7, 1947

INVENTOR.
D. J. DANIEL
BY Bryant & Lowry
ATTORNEYS.

Patented Nov. 8, 1949

2,487,316

UNITED STATES PATENT OFFICE 2,487,316

LINE SLACK ELIMINATOR FOR REELS

Daniel J. Daniel, Fort Smith, Ark.

Application July 7, 1947, Serial No. 759,453

2 Claims. (Cl. 242—84.5)

This invention relates to improvements in winding and reeling, and more particularly as applied to casting reels, whereby to prevent entanglement of the line due to backlash as the line is being wound on or unwound from a reel.

As applied to casting reels, the object of this invention is to provide means to automatically perform the function of what is ordinarily referred to by fishermen as "thumbing" the reel.

Generally, the object is to provide means on a reel for producing a slight drag on the reel in response to any undue slack in the line running off or on the reel, by pressing the line against the spool near the point where it leaves the spool.

Another object is to prevent a reel from over-running when the line is being pulled off of it at a decreasing speed.

Another object is to construct a bracket for mounting on a reel, having means for preventing the spool from over-running as mentioned above.

Another object is to provide such means by forming an eyelet for the line at the end of one arm of a lever pivotally mounted on said bracket, the other arm of which has a weighted drag which normally rests on the core of the spool, and resiliently biasing said lever against the pull of the line which normally lifts said weighted drag off said core when said line is pulled taut in paying it out.

Other and more specific objects will become apparent in the following detailed description of one form of device illustrating the present invention as applied to a casting reel.

Figure 1:
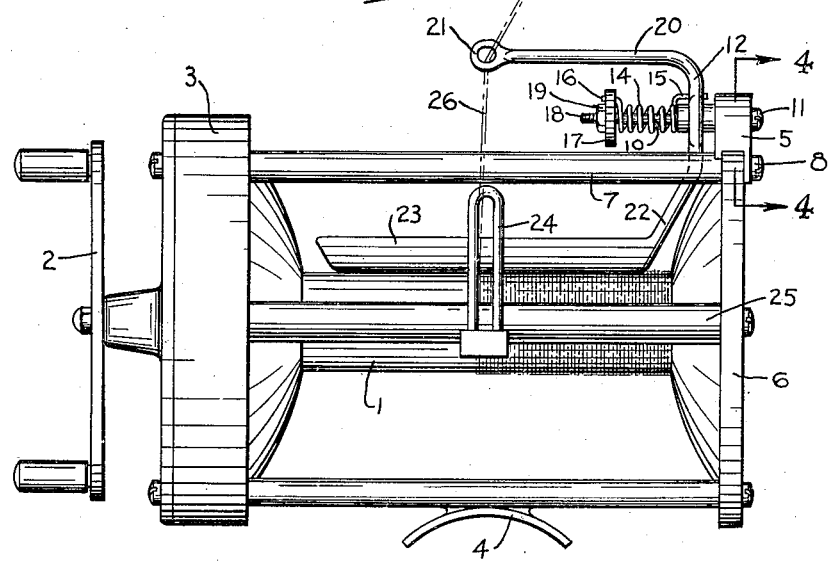
Figure 2:
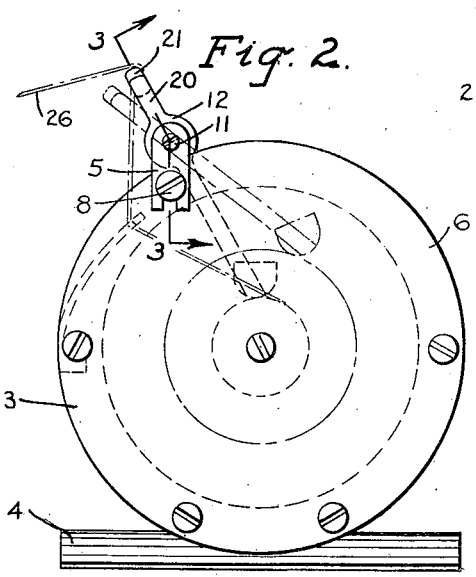
Figure 3:
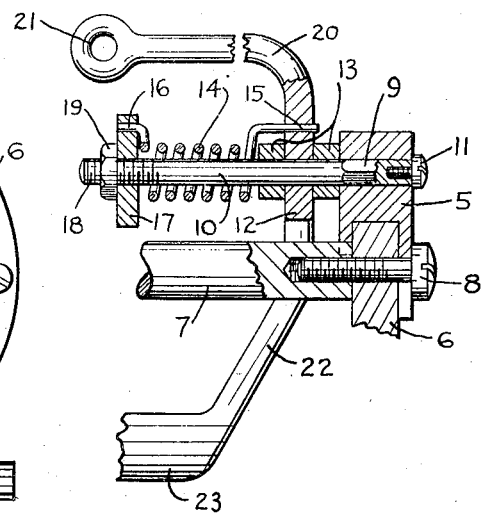
Figure 4:
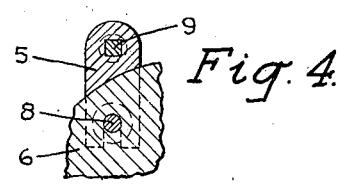

In the drawing, Figure 1 is an elevational view of a casting reel having this device attached thereto, Figure 2 is an end view thereof, Figure 3 is an enlarged detail view of the bracket and the lever pivotally mounted thereon, shown partly in section taken on the line 3—3 of Figure 2, and Figure 4 is a sectional view taken on the line 4—4 of Figure 1.

Broadly, this invention is applicable wherever a thread or line is being fed from a reel or spool at varying speeds, to prevent over-running of the reel or spool during intervals of decelerating feed, by braking means which are normally released as long as the thread or line is taut, as during steady or accelerating speeds. The purpose obviously is to prevent backlash and possible entanglement of the thread or line with itself or adjacent parts.

For purposes of illustration, a device constructed in accordance with this invention is shown in the drawing, applied to a casting reel.

The casting reel comprises the spool 1 with manually operative handle 2, freely rotatably mounted in the cage 3 to which a curved bracket 4 is connected for mounting on a pole.

The bracket 5 is formed, as shown, to fit snugly over the end plate 6 of the cage 3, and to rest on one of the axial cage pins 7 at the inner side, and to fit slidably over the shank of the screw 8 which supports the axial pin 7 to the end plate 6, at the outer side.

Bracket 5 is provided with a square hole for supporting the square shank 9 of pivot pin 10. A lock screw 11 is provided in the end of the square shank 9 for locking it in place in the bracket. A lever 12 flanked by washers 13 is pivotally mounted on the pivot pin 10 as shown. A coil spring 14 has its one end fixed in the lever at 15 and its other end 16 is fixed in a thumb nut 17 mounted on the threaded end 18 of the pivot pin 10, for biasing said lever resiliently in accordance with the adjustment of the thumb nut 17. A lock nut 19 is provided for locking the thumb nut in any adjusted position. The arm 20 of lever 12 is bent toward the middle of the reel and has an eyelet 21 formed at its end. The arm 22 of lever 12 is bent as shown and is provided with a weighted drag 23, which is normally resiliently biased by spring 14 against the core of the spool 1 to provide braking for said spool when it is rotating.

A level winding guide 24 is mounted in the middle of one of the axial cage pins 25 so that when the line 26 is passed from the spool through this guide 24 and then through the eyelet 21 before passing it out to the end of the pole, it will operate the lever 12 against the bias of spring 14 to lift the weighted drag off the spool, whenever the line is pulled taut.

The tension of spring 14 may be suitably adjusted by turning thumb nut 17 on thread 18 and then locking it in adjusted position by means of lock nut 19.

In casting with the ordinary reel without the benefit of the present improvement, trouble has been experienced in getting the line tangled at the reel. The speed of the line leaving the reel spool at the time of the thrust or cast is a maximum and turns the spool at a maximum speed of rotation. As the lure flies through the air, it is slowed down by air resistance and other interferences and ultimately stops. While the lure decelerates quite rapidly, the spool in the ordinary reel continues to unwind at substantially maximum speed since it has little friction, unless additional friction or some form of brakes are applied to the spool. If no brakes are applied and the spool is allowed to overrun, the line acquires backlash at the spool; i. e. it accumulates there because the spool pays it out faster than it is being drawn off by the lure. As the deceleration of the lure continues, the accumulation of excess line increases more rapidly, and tangling usually results. To avoid this backlash it has been customary with some sportsmen to resort to "thumbing," or using the thumb to apply the required braking to the spool. To thumb the spool properly requires expert manipulation and great concentration of thought.

The device here disclosed automatically operates to provide proper braking only to the extent required to equalize the speed of the spool with that of the lure, without retarding the lure excessively. This is done by a balancing method or governing control. The fishing line itself operates the mechanism during the casting process. The line comes off the spool in the usual manner, passes under the weighted drag, through the level winding guide, and then through the eyelet or line guide at the other end of the lever out to the end of the fishing rod or pole and to the lure. Thus when the thrust or cast is made, and the line is sent on its way, as long as the line leaving the spool is kept taut the lever is operated to lift the weighted drag off the spool, but as soon as there is any slack in the line at the spool due to overrunning of the spool, the lever is released to its normal position where the weighted drag acts as a brake on the spool and slows it only sufficiently to correspond with the slowing down of the lure, whereupon the line again becomes taut and operates the lever to free the spool. This balancing continues throughout the casting process until the lure stops.

A similar control of spools or reels is desirable in many other applications, as e. g. in feeding thread or yarn in various weaving and knitting machines, where the feed is intermittent, or is subject to variation in speed.

Obvious modifications in design of the several parts of the device to adapt it for specific uses may be made without departing from the spirit and scope of this invention, as defined in the appended claims.

What is claimed is:

1. The combination with a fishing reel having a spool, a frame and an end plate on said frame; with a bracket secured to said end plate, a shaft fixedly mounted on said bracket and extending over said spool, a lever rockingly mounted on said shaft and held from movement therealong, a torsion spring having one end fixedly connected to said shaft and the other end fixedly connected to said lever, said spring being arranged to urge the lever to rotate in one direction, an arm projecting over said spool and provided with a fish line-receiving eye at its end, said arm projecting from the upper end of said lever, and a counter-weight projecting from the lower end of said lever and tending to act against said spring, said counter-weight extending along said spool to rest on the wound part of a fish line carried by said reel.

2. The combination with a fishing reel having a spool, a frame and an end plate on said frame; with a bracket secured to said end plate, a shaft fixedly mounted on said bracket and extending over said spool, a lever rockingly mounted on said shaft and held from movement therealong, a torsion spring having one end fixedly connected to said shaft and the other end fixedly connected to said lever, said spring being arranged to urge the lever to rotate in one direction, an arm projecting over said spool and provided with a fish line-receiving eye at its end, said arm projecting from the upper end of said lever, and a counter-weight projecting from the lower end of said lever and tending to act against said spring, said counter-weight extending along said spool to rest on the wound part of a fish line carried by said reel, said reel having a level winding device traversing the length of said counter-weight.

DANIEL J. DANIEL.

REFERENCES CITED

The following references are of record in the file of this patent:

UNITED STATES PATENTS

| Number | Name | Date |
| --- | --- | --- |
| 329,711 | Briggs | Nov. 3, 1885 |
| 2,144,984 | Kyle | Jan. 24, 1939 |
| 2,261,610 | Yarosz | Nov. 4, 1941 |
| 2,341,073 | Babcock | Feb. 8, 1944 |
| 2,374,551 | Margis, Jr. | Apr. 24, 1945 |